United States Patent [19]

Fairbanks

[11] Patent Number: 5,069,078
[45] Date of Patent: Dec. 3, 1991

[54] TRANSMISSION MECHANISM

[76] Inventor: Everitt E. Fairbanks, 3263 S. Clay St., Green Bay, Wis. 54301

[21] Appl. No.: 559,657

[22] Filed: Jul. 30, 1990

[51] Int. Cl.⁵ .............................................. F16H 3/00
[52] U.S. Cl. ...................................... 74/216.3; 74/191
[58] Field of Search ................. 74/191, 192, 193, 214, 74/215, 216, 216.3

[56] References Cited

U.S. PATENT DOCUMENTS 2,869,378  1/1959  Fischer ............................... 74/216.3
3,873,128  3/1975  Dunder et al. ..................... 74/192 X
4,616,519  10/1986  Yoshida ................................. 74/191

FOREIGN PATENT DOCUMENTS 621322   6/1961  Canada ................................... 74/191
2101126  8/1972  Fed. Rep. of Germany ........ 74/192
2416401  10/1979  France .................................. 74/191

OTHER PUBLICATIONS

*Mechanisms, Linkages, and Mechanical Controls*; Nicholas P. Chironis; 1965; pp. 4-5.

*Primary Examiner*—Dirk Wright
*Attorney, Agent, or Firm*—Roger A. Marrs

[57] ABSTRACT

A load and motion transmitting apparatus is disclosed herein having a housing operably mounting a pair of spaced shafts having parallel turning axes where each shaft has a conical portion tapering in a direction opposite to the conical portion of the other shaft. The rotative movement of the driving shaft conical portion of the pair is transmitted to the driven shaft conical portion via a spherical intermediate drive member held in a movable carriage. The periphery of the conical portions includes hemispherical recesses arranged in circumference rows across the length of each conical portion so that relative velocity of the two shafts is controlled by axial movement of the drive member via the carriage. The carriage encloses a plurality of spherical drive members in a series so that each drive member transfers a driving load or force between conical portions in a serial sequence. The carriage location along the conical portions determines a variety of "gear ratios".

1 Claim, 1 Drawing Sheet

TRANSMISSION MECHANISM

BACKGROUND OF THE INVENTION

1. Field of the Invention

The present invention relates to the field of load or power transmissions and more particularly to a novel variable speed transmission of the friction-drive type having opposing cones with a load translating means interposed therebetween.

2. Brief Description of the Prior Art

A conventional motion transmitting mechanism as is known in the prior art usually comprises a pair of cones, each mounted on a shaft with the cones being oppositely inclined. In order that the intermediate drive member may operate between parallel surfaces, the cone pairs generally have the same cone angle and the shafts are aligned parallel in their mounting. Variation in the speed of rotation of the driven cone relative to the driving cone is obtained by shifting the intermediate drive member so that it bears against a relatively larger or a relatively smaller part of the driven cone. Thus, to increase the speed of rotation of the driven cone relative to the driving cone, the intermediate drive member is moved in the opposite direction. A separate shifting means is usually included to provide the required axial movement of the intermediate drive member. Various arrangements may be used to provide this axial movement such as worm threaded screws, shift bars, or other similar type devices.

Certain disadvantages have been encountered in prior arrangements of this type. These include difficulties in maintaining the proper degree of contact between the several drive components. Slippage of the intermediate member and its driving and driven cones is always present. This adversely affects load transferring and driving efficiency. Moreover, prior mechanisms have experienced difficulties in changing both speed and direction of rotation. Back rotation and slippage are generally experienced in conventional mechanisms.

SUMMARY OF THE INVENTION

Accordingly, the above problems and difficulties are obviated by the present invention which provides a novel transmission apparatus having a driving shaft and a driven shaft arranged in spaced-apart relationship wherein both of the shafts are of circular cross-section and each shaft carries a conical portion in opposition to each other. The exterior surface of each shaft is provided with rows of hemispherical recesses or indentations and the columns of the recesses are in alignment with respect to the driven and the driving conical portions. A plurality of load-transferring members of spherical configuration is arranged in a series so as to be sequentially interposed between aligned and opposing recesses of the driving and the driven conical portions. The plurality of spherical members are contained in a carriage having an opening so as to expose at least one of the spherical members to the aligned hemispherical recesses for performing load transfer and motion exchange. The carriage is slidably mounted on an inclined rod having a plurality of openings therein which when aligned with a pin, sets the carriage in respective position regarding the cone portions for a specific gear ratio relationship. Spring biasing means are provided for yieldably feeding the spherical members to the respective recesses in the driving and the driven conical portions, and a lead screw means is provided for selectively moving the carriage along the mounting rod.

Therefore, it is among the primary objects of the present invention to provide a novel load and motion transmitting apparatus which is substantially slip-free between the driving and the driven members.

Another object of the present invention is to provide an improved transmission apparatus of the frictional drive type that is free of slippage between load-transferring parts and which has a high degree of efficiency in motion and load-transferring characteristics.

Yet another object of the present invention is to provide a novel transmission apparatus provided with an arrangement to change the speed and the direction of rotation in a novel manner without back rotation or slippage.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
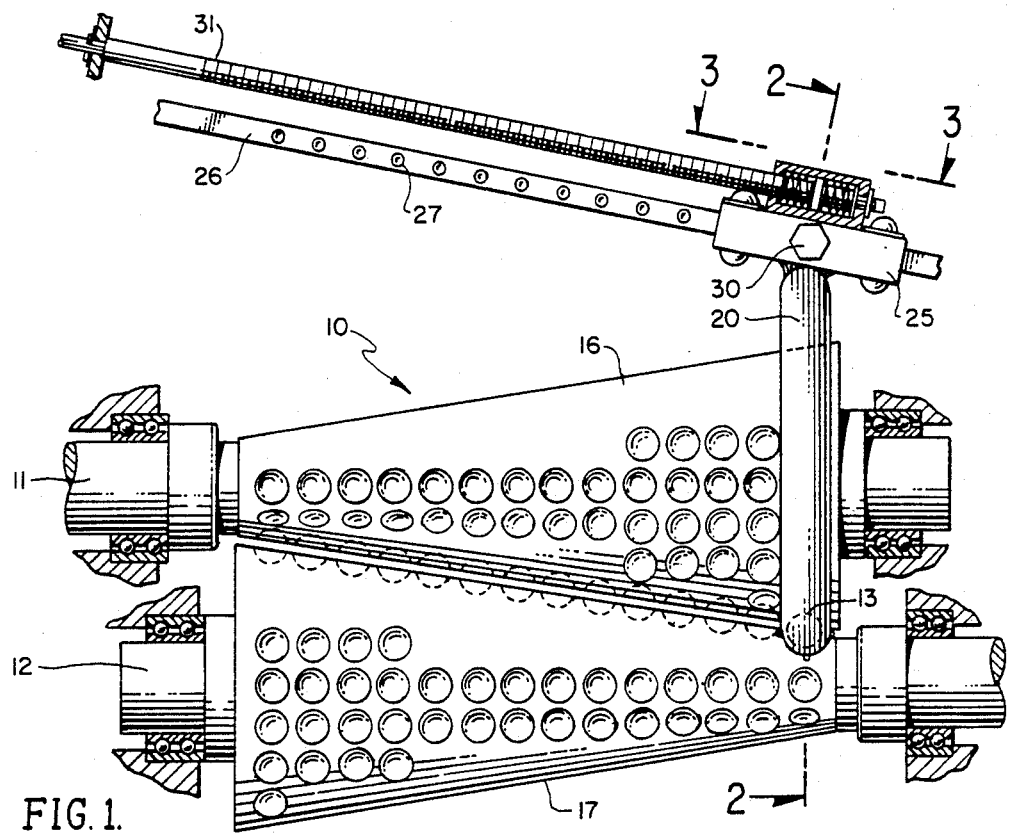
FIG. 1 is a side elevational view of the novel transmission apparatus incorporating the present invention.

Referring to FIG. 1, the novel transmission apparatus of the present invention is illustrated in the general direction of arrow 10 which includes a pair of aligned shafts of which shaft 11 is the driving shaft and shaft 12 is the driven shaft. The shafts are suitably mounted with their axes parallel between suitable journals or bearings. An intermediate drive member is included for transmitting rotative drive as well as applied loads from the shaft 11 to the shaft 12. The intermediate drive member comprises a member of at least partially circular cross-section, such as a spherical member or ball 13. The ball is retained between opposed hemispherical recesses 14 and 15 as seen in FIG. 2, each of which is formed on the periphery of conical portion identified by numerals 16 and 17 carried on the shafts 11 and 12 respectively.

It can be seen in FIG. 1 that the hemispherical recesses represent a multiplicity which are arranged around the circumference of each cone. The longitudinal cone spacing between adjacent rows is arranged to accommodate the changing number of recesses as each cone circumference dimension changes. The cone portions are specifically aligned so that the hemispherical recesses in the respective columns will register with one another so as to accommodate occupation between aligned semicircular recesses by the ball 13. Once the intermediate spherical drive member is located in opposing recesses, power or load forces may be transmitted between the shafts and the conical portions with minimum pressure contact and without slippage.

Power ratio may be changed throughout a variety of ratios by positioning the ball 13 between adjacent columns of recesses along the parallel rows of recesses. To move the ball from one column to another, a carriage 20 is provided which houses a plurality of intermediate spherical members 13, as illustrated in FIG. 2, so that the various members 13 are arranged in a series and provided to the opposing recesses 13 and 14 in an ordered sequence. Inasmuch as the diameters differ from one conal portion to another conal portion with respect to the columns of recesses, a variety of drive ratios is provided.

Figures 2, 3, 4:
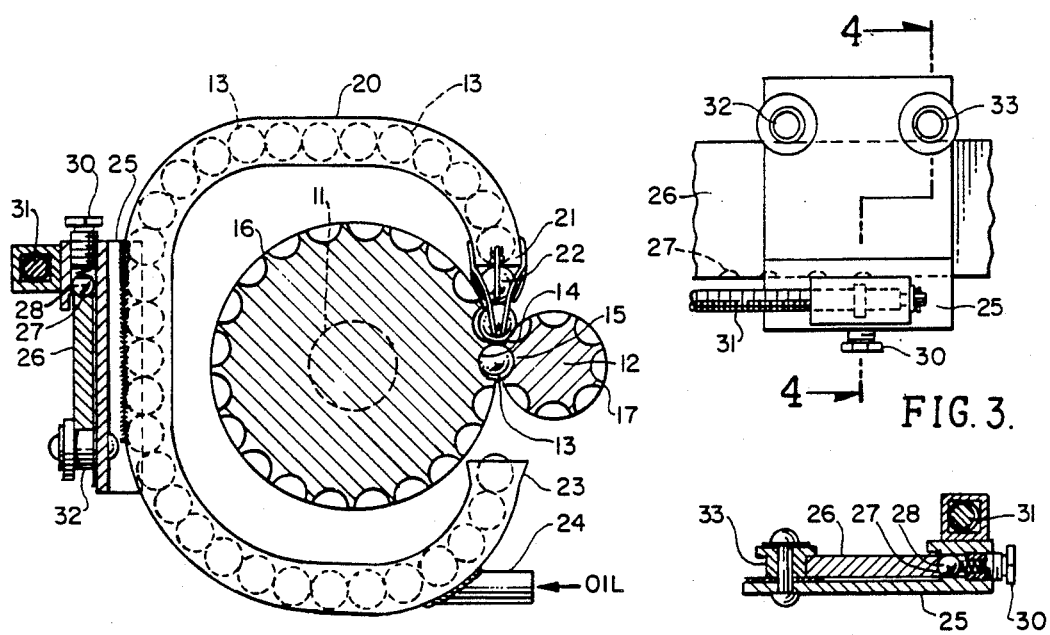
FIG. 2 is a transverse cross-sectional view of the transmission apparatus shown in FIG. 1 as taken in the direction of arrows 2—2 thereof.
FIG. 3 is a fragmentary view showing a detent ball and spring retainer for mounting the spherical member carriage.
FIG. 4 is a cross-sectional view of the retainer shown in FIG. 3 as taken in the direction of arrows 4—4 thereof.

As shown more clearly in FIG. 2, the series of intermediate spherical members 13 is arranged in an endless circle or oval and each ball or member 13 is fed to awaiting recesses through a discharge opening or nozzle 21 having spring fingers 22 for guiding the balls into position to be picked up by the recesses as they rotate past the spherical member. Once the load and motion have been transferred between the conical portions, the spherical member 13 will drop into a collector 23 rejoining other balls in the plurality for rotation through the carriage in the ordered sequence A suitable lubricant is entered through the nozzle 24 so that the intermediate spherical members or balls are thoroughly lubricated and friction reduced.

In FIGS. 1 and 2, it can be seen that the carriage 20 is mounted on a sliding base 25 which moves along a fixed bar 26. The edge of the bar 26 includes a plurality of holes or detent recesses 27 into which a spring-loaded detent 28 projects for releasable retention.

The carriage 20 may be moved along the bar 26 by any suitable means; however, a lead screw 31 is illustrated. Also, as shown in FIG. 3, a pair of rollers 32 and 33 against which the spring force of the detent 30 and 28 bears.

Therefore, the spring fingers are employed to ensure alignment and positioning of the intermediate spherical members or balls for insertion into the respective recesses or mating holes in the cone portions. The spring tension is light enough to permit ball movement between the cones at any required rate but stiff enough to keep the balls positioned for next ball insertion into the mating holes.

The high pressure oil inlet tube 24 conducts enough pressure on the oil stream to force the ball bearings around the carriage assembly and to the sprinq fingers. The ball recirculating assembly is offset at both ends of the cone line towards the small end of each cone, as shown. This feature improves spacing between ball recirculating assembly and the rotating cones. A further feature resides in placing the detents in the track or bar 26 so as to align ball recirculating assembly and the carriage with corresponding cone hole rows.

In view of the foregoing, it can be seen that the transmission apparatus of the present invention comprises the two cone portions supported by bearing sets so that they are separated by approximately 1/16 of an inch. The driving cone is driven by a suitable power plant or engine and the driven cone is keyed to the driving cone by the recirculating ball bearing carriage, as illustrated in FIG. 2. The ball bearings fit into mating hemispherical or rounded recesses arranged in rows along the length and diameter of both cones.

The intermediate spherical members or balls are recirculated around the top cone in a carriage assembly 20 and the carriage is welded to supporting plates on both sides of the gap between the cone portions. The mounting plates are each supported by rollers between the opposite sides of bar 26, as illustrated. A suitable spring-biased detent retainer is provided so that the carriage may be releasably held at selected locations along the length of the bar on which it slides and the detents are in alignment with the columns of recesses carried on the cone portions respectively.

The carriage assembly is positioned by a suitable motor driven lead screw assembly.

The intermediate spherical members are moved as a unit in sequence and in serial order under oil pressure that is forced into the interior of the carriage via the oil nozzle 24. The spherical members or balls move within the recirculating carriage or tube and into the mating cone portion recesses via the finger springs. The members or balls are collected on the opposite side of the cone gap by the effective funnel-shaped split end 23 of the carriage assembly. The bottom cone will be partially submerged in a light, low-viscous oil and jets of high pressure oil may also be used to ensure separation of the ball bearings or spherical members from the cone recesses to facilitate their reinsertion into the recirculating carriage tube after their travel through the cone gap.

"Gear ratios" are changed by repositioning the carriage assembly and this is achieved by rotating the lead screw assembly. This, in turn, causes a square nut to put tension on one of the two springs in the same housing. When the spring tension exceeds the pressure required to move the spring-loaded roller out of its detent position on the supporting bar, the positioning assembly will snap to the next detent position allowing the ball bearing recirculation with a new row of holes.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A transmission mechanism comprising the combination of:
    a housing;
    a pair of spaced-apart shafts having parallel turning axes wherein each shaft includes a conical portion tapering in a direction opposite to the conical portion of said other shaft;
    a selected one of said shafts being a driving shaft conical portion for forcibly urging the other of said shafts constituting a driven conical portion;
    a plurality of hemispherical recesses carried on said pair of conical portions arranged in rows around the circumferences and spaced along the length of each of said conical portions and in spaced-apart columns;
    a movable hollow carriage of C-shape configuration having open ends opposing each other in fixed spaced apart relationship separated by the close proximity of said driving and said driven conical portions;
    a plurality of spherical intermediate drive members movably retained in said hollow carriage for feeding a selective one of said drive members for transmitting rotative movement between said drive conical portion and said driven conical portion whereby relative velocity of said pair of shafts is controlled by axial movement of said carriage along said conical portions;

said plurality of said drive members are enclosed within said carriage in a linear series so that each drive member transfers a driving force between said conical portions in a serial sequence;

lead screw means operably connected to said carriage for selectively moving said carriage along the length of said conical portions to determine a multiplicity of "gear ratios";

said carriage includes means for feeding said drive members to said recesses in an orderly manner including resilient clips carried at a selected one of said carriage open ends for presenting said selected one of said drive members to said conical portions' recesses which are in opposition facing each other;

said carriage open end opposite to said open end carrying said clips adapted to receive said selected one of said drive members in response to movement of said drive members through said hollow carriage.

* * * * *